_United States Patent_ [19]

Asahina et al.

[11] Patent Number: 4,870,896
[45] Date of Patent: Oct. 3, 1989

[54] INSTALLATION METHOD OF A KNEADING TROUGH IN AN OVEN AND ITS APPARATUS

[75] Inventors: Takashi Asahina, Yamatokoriyama; Mitsuo Akiyoshi, Nara; Yoshio Mitsumoto, Kashihara; Satoru Kodama, Nara; Masaharu Tsujimoto, Higashiosaka, all of Japan

[73] Assignee: Matsushita Electric Industrial Co., Ltd., Osaka, Japan

[21] Appl. No.: 291,296

[22] Filed: Dec. 28, 1988

[30] Foreign Application Priority Data

Dec. 28, 1987 [JP] Japan .................................. 62-332023
Jan. 28, 1988 [JP] Japan .................................. 63-18024
Jul. 18, 1988 [JP] Japan .................................. 63-178631

[51] Int. Cl.[4] .......................... A47J 27/00; B23Q 7/00; B23P 11/00
[52] U.S. Cl. ........................................ 99/348; 29/428; 29/559
[58] Field of Search ..................... 29/559, 428; 99/348, 99/513

[56] References Cited

U.S. PATENT DOCUMENTS

| 3,892,365 | 7/1975 | Verdun ............................. 99/513 X |
| 3,924,838 | 12/1975 | Waniishi et al. .................. 99/348 X |
| 4,538,509 | 9/1985 | Ojima et al. ............................ 99/348 |
| 4,776,265 | 10/1988 | Ojima ..................................... 99/348 |

FOREIGN PATENT DOCUMENTS

| 205066 | 12/1983 | German Democratic Rep. ... 99/348 |
| 2093553 | 9/1982 | United Kingdom .................. 99/348 |

_Primary Examiner_—Charlie T. Moon
_Attorney, Agent, or Firm_—Wenderoth, Lind & Ponack

[57] ABSTRACT

A heating and cooking apparatus has a kneading trough detachably installed in a heating chamber of the apparatus and provided with a handle for easy carrying for a user. Since both the kneading trough and a portion to be engaged with the kneading trough in the heating chamber are formed square, the force in the rotating direction during the operation can be positively received by the corners, thereby enhancing the strength of the apparatus, without rattlings or wearing-out or disengagement of the engaging portion therebetween.

14 Claims, 9 Drawing Sheets step ① step ② step ③

INSTALLATION METHOD OF A KNEADING TROUGH IN AN OVEN AND ITS APPARATUS

BACKGROUND OF THE INVENTION

The present invention generally relates to a heating and cooking apparatus having a kneading trough detachably accommodated therein, and more particularly, to an installation method and arrangement of the kneading trough in the heating and cooking apparatus.

Conventionally, an oven has been used when an object or a food is cooked through roasting. Meanwhile, a kneading device has been employed for the object to be cooked through kneading. Recently, however, an automatic bread baking apparatus has been brought into the market by which, for example, bread can be automatically made through consecutive operation from kneading to baking. Before the arrival of the automatic bread baking apparatus, an oven equipped with a kneading arrangement has been also in the market. In the above-mentioned oven equipped with the kneading arrangement, after a trough special for kneading is accommodated in the oven so as to knead the material, the trough should be taken out of the oven, and the kneaded material should be changed into another trough or plate for fermentation and baking.

The former automatic bread baking apparatus is exclusively used for bread. Therefore, in the case where a variety of breads such as rolls, croissants, etc. are desired, the apparatus can serve only for a part of a series of the baking operation, namely, kneading and fermentation, with requiring an oven to be added which is large enough to bake several rolls or croissants, etc. at one time on a plate.

On the other hand, in the latter oven having a kneading device, in either case where bread is baked, or the other kind of bread is desired, the material after finishing partial fermentation should be changed into another trough for baking operation, thus resulting in complicated and troublesome procedure.

In recent years, it has been thought out that three cooking operations, that is, kneading, baking and roasting operations, each conventionally fulfilled by the kneading device, automatic bread baking apparatus and oven, respectively, be performed by a single cooking unit. The cooking unit is achieved simply by adding a special trough into the oven, which is therefore advantageous in space-saving and cost-saving points of view. Accordingly, one becomes able to bake bread automatically whenever he or she wishes. Moreover, although the kneaded material is necessary to be transferred onto the oven plate for baking, a variety of breads can be fully satisfied by the cooking unit. Not only the kneading operation which has been considerably annoying to a user can be automatically done by the unit, but those kinds of breads that are complicated in shape and frequently required can be really automatically baked.

It is needless to say that the above-described cooking unit is able to be used in combination with an electronic oven range or a toaster range, realizing more highly concentrated cooking apparatus.

The trough exclusive for kneading and baking operations has generally the capacity of 1-2 loaves of bread, which will be apparent from the fact that the automatic bread baking apparatus in the commercial market is rendered capable of baking 1-2 loaves of bread. When the trough is put in or taken out of the center of the heating chamber of the electric oven, many problems are given rise to. In other words, the operation itself is troublesome, causing an erroneous operation which results in an accident or breakage of the oven, a burn of the user, etc. In addition, since the kneading operation requires large rotating force with high speeds, it is necessary that the trough and the electric oven be completely secured to each other.

It is clear that the same thing goes with a heating and cooking apparatus, not limited to the above case, which can make rice-cakes, sourdoughs of cakes and cookies or can serve as a juicer or a mixer rotated at high speeds.

Figure 1:
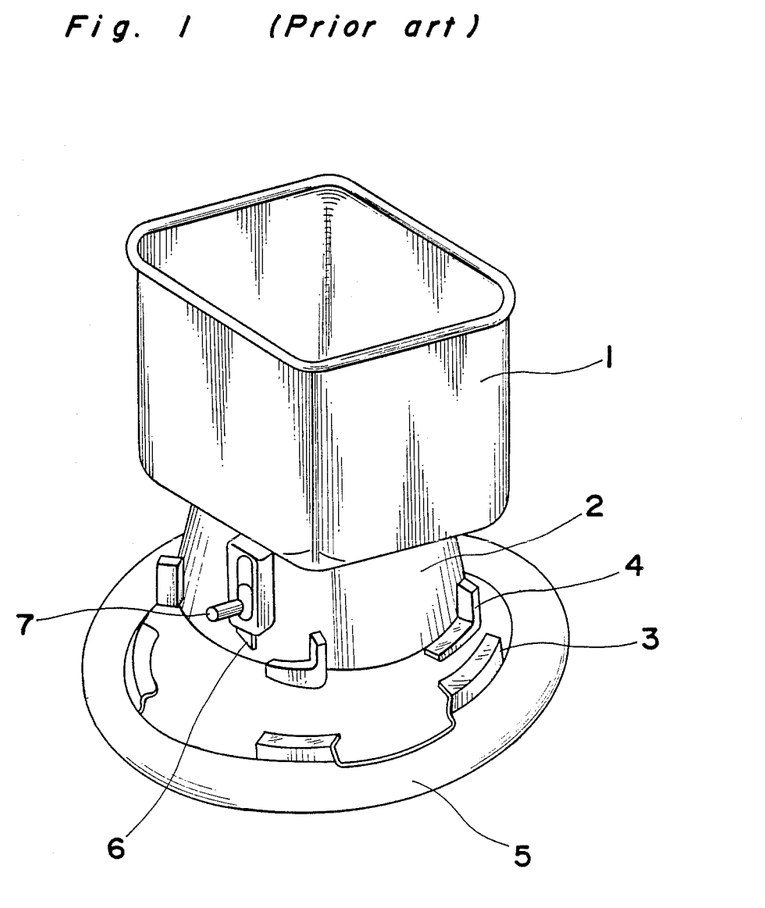
FIG. 1 is a perspective view of an engaging portion of a kneading trough in a conventional heating and cooking apparatus.

FIG. 1 shows an example how a kneading trough is fixed to the heating and cooking apparatus in the conventional manner. The kneading trough 1 has a foot part 2, so that the trough 1 is mounted through the foot part 2 in a to-be-engaged portion 3 formed in a fitting part 5 at the bottom of a heating chamber. Several projections 4 are formed in the foot part 2. Accordingly, when the trough 1 is placed at the bottom of the heating chamber and rotated by predetermined angles, the projections 4 of the foot part 2 are come into secure engagement with the to-be-engaged portion 3 at the bottom of the heating chamber. Since the foot part 2 is formed circular, a lock member 6 is provided so as to prevent the trough 1 from slipping off the to-beengaged portion 3 during rotation. The lock member 6 is come in position by vertical movement of a lever 7.

According to the above-described method for installing and securing the trough into the apparatus through rotation of the trough, both hands of the user are needed to install or detach the trough. In the case where a series of operation from kneading to baking is consecutively carried out, for example, when bread is baked, the trough should be taken out of the apparatus while the lever of the lock member is manipulated after the bread is completely baked. Particularly, when the trough is desired to be removed from the apparatus immediately after the completion of baking, it may be feared that a burn or an injury be possibly given to the user since the interior of the heating chamber becomes hot.

In the electric oven or the electronic oven range which can function also as a kneading device, it is so arranged that the kneading trough is fixedly accommodated into the box-like heating chamber, therefore, into a limited space of the heating chamber. The trough is inserted into the interior of the heating chamber from a lateral window, and placed in the bottom of the heating chamber in such manner as to be pressed down into the bottom of the heating chamber, and then rotated for fixing. Thus, the installation method of the trough in the electric oven or the electronic oven range equipped with the kneading arrangement is quite inconvenient in use. The oven may be operated even though the engagement between the trough and the main body of the oven is insufficient, causing an accident of the oven or taking a fire. Moreover, if the inside surface of the heating chamber is coated with points or undergoes the surface-treatment, the coated or the surface-treated surface may be damaged because of the friction during the engagement, resulting in unfavorable appearance. Further, in the case where the to-be-engaged portion, in the bottom of the heating chamber is formed by a sheet metal, the end surface of the sheet metal is exposed and accordingly becomes an obstacle to cleaning, resulting in residual moisture and dregs in the engaging portion. Hands may be cut when the stains or the food residues are removed. Accordingly, the installation method of the trough through rotation is disadvantageous from the viewpoints of operating convenience, cleanliness and safety.

Moreover, according to the above-described installation method of the trough through rotation, when the trough is installed in or taken out of the oven, a large friction force works in the engaging portion, and therefore projections and the to-be-engaged portion are warn out. The engaging force is lessened as the trough is repeatedly installed in or taken out of the oven, resulting in rattlings during the rotation or disengagement of the trough from the oven.

In fact, as described hereinabove, the conventional method for installing the kneading trough into the oven carries such fears as are resulted in a failure of cooking because of the rattling or disengagement of the trough during the operation as well as an accident or a fire of the oven. Further, in the conventional installation method, the user may be burnt or get injured, or receive an electric shock.

SUMMARY OF THE INVENTION

Accordingly, an essential object of the present invention is to provide a heating and cooking apparatus which is so arranged that a kneading trough is easily installed in or taken out of a heating chamber.

A second object of the present invention is to provide a heating and cooking apparatus of the type referred to above in which the kneading trough is easily and securely installed in or taken out of a heating chamber without rotating the trough.

A third object of the present invention is to provide a heating and cooking apparatus of the type referred to above in which the kneading trough is so engaged with the heating chamber as to be easily installed in or taken out of the heating chamber while a large rotating force from a motor which is a driving source for kneading is securely transmitted to a kneading vane.

A fourth object of the present invention is to provide a heating and cooking apparatus of the type referred to above in which the kneading trough and the heating chamber are secured to each other through projected portions thereof with the help of the adhesive suction force of the magnetic elements, instead of the friction force as a result of the rotation of the engaging portion, so that it becomes easy to install the kneading trough into the heating chamber and to clean the trough, without rattlings due to the friction during the rotation taking place.

A fifth object of the present invention is to provide a heating and cooking apparatus of the type referred to above in which a handle is provided in the kneading trough at the lateral side of the trough, so that one can hold the kneading trough easily by one hand with safety.

In accomplishing the above-described objects, according to the present invention, the kneading trough and the to-be-engaged portion at the bottom of the heating chamber are formed square to receive the force in the rotating direction of the trough by the corners, and accordingly the strength in the rotating direction is increased, so that the kneading trough is prevented from rattling or the trough is prevented from being disengaged from the apparatus during the operation. Therefore, the heating and cooking apparatus of the present invention is improved in operating safety. Because of the square shape of the kneading trough, the kneading trough can be easily positioned in the heating and cooking apparatus. The user can get rid of worrisome manipulations when the kneading trough is installed in or removed from the heating and cooking apparatus.

Furthermore, according to the present invention, the kneading trough is provided with a projected portion and also the to-be-engaged portion in the heating chamber is formed with a hole or a groove, and moreover both of the kneading trough and the to-be-engaged portion in the heating chamber are provided respectively with a magnetic element. Consequent to this, the projected portion of the kneading trough and the to-be-engaged portion of the heating chamber can be vertically secured to each other because of the attraction force of the magnetic elements. Accordingly, the engaging portion is free from wear and tear, and the coating or surface-treatment of the engaging portion is never damaged. The user can enjoy a good looking of the apparatus at all times.

Since a handle is provided in the kneading trough at the lateral side thereof, the user can install or detach the kneading trough by one hand, which is highly convenient in use and safe, without dangerous injury or burn being added when the user installs or removes the kneading trough.

BRIEF DESCRIPTION OF THE DRAWINGS

These and other objects and features of the present invention will become apparent from the following description taken in conjunction with preferred embodiments thereof with reference to the accompanying drawings, in which:

FIG. 6 is views, a plane view (A), a front view (B) and a partial side view (C), of a prime rotary coupling member in the heating and cooking apparatus of FIG. 2;

FIG. 7 is views, a plane view (A), a front view (B) and a partial side view (c), of a driven rotary coupling member in the heating and cooking apparatus of FIG. 2;

DESCRIPTION OF PREFERRED EMBODIMENTS

Before the description of the present invention proceeds, it is to be noted here that like parts are designated by like reference numerals throughout the accompanying drawings.

Referring to the heating and cooking apparatus shown in FIGS. 2–8, an outer block 10 of the apparatus has a heating chamber 11 at the bottom of which is mounted a fitting part 5 formed of aluminum through die casting so as to fix a kneading trough 1. There is formed a to-be-engaged part 3 in a generally square shape in the fitting part 5. The to-be-engaged part 3 has a hole portion 12 in which a projected portion 4 of a foot, 2 of the kneading trough 1 is inserted. When the projected portion 4 is inserted in the hole portion 12, a permanent magnet 13 built in the lower part of the fitting part 5, is securely adhered to a metal plate 14 which is made of a ferromagnetic material in a position corresponding to the permanent magnet 13 at the bottom of the foot part 2. It may be possible that the metal plate 14 is built in the lower part of the fitting part 5 and the permanent magnet 13 is provided in the foot 2 of the kneading trough 1. A handle 15 is provided in the lateral surface of the kneading, trough 1, so that the kneading trough 1 can be easily installed in or removed from the heating and cooking apparatus, or carried out. Inside the kneading trough 1 is detachably and rotatably placed a kneading vane 16 for kneading the material. A driving motor 17-transmits the rotating force, through a small pulley 18, a belt 19 and a large pulley 20, to a first rotary shaft 21. A prime rotary coupling member 32 is fixedly mounted in the first rotary shaft 21, which is meshed with a driven rotary coupling member 33 integrally formed with a second rotary shaft 34 of the kneading trough 1. Therefore, the rotating force transmitted to the first rotary shaft 21 is transmitted to the second rotary shaft 34, thereby rotating the kneading vane 16. The motor 17 is controlled by a control unit 22, so that the motor 17 is rotated in a reversed direction or in an intermittent manner. Moreover, the heating and cooking apparatus includes an upper heater 23 in the upper part of the heating chamber 11 and a lower heater 24 in the lower part of the heating chamber. Those heaters 23 and 24 are operated in the fermentation and baking operations, and the temperatures of the heaters 23 and 24 are also controlled by the control unit 22. Moreover, the upper and lower heaters 23 and 24 are respectively covered with an upper insulative member 29 and a lower insulative member 30 for the purpose of improving the thermal efficiency. A magnetron 25 which is employed in the high frequency heating operation emits high frequency waves through an opening 31 formed in the lateral wall of the heating chamber into the heating chamber 11.

Figure 2:
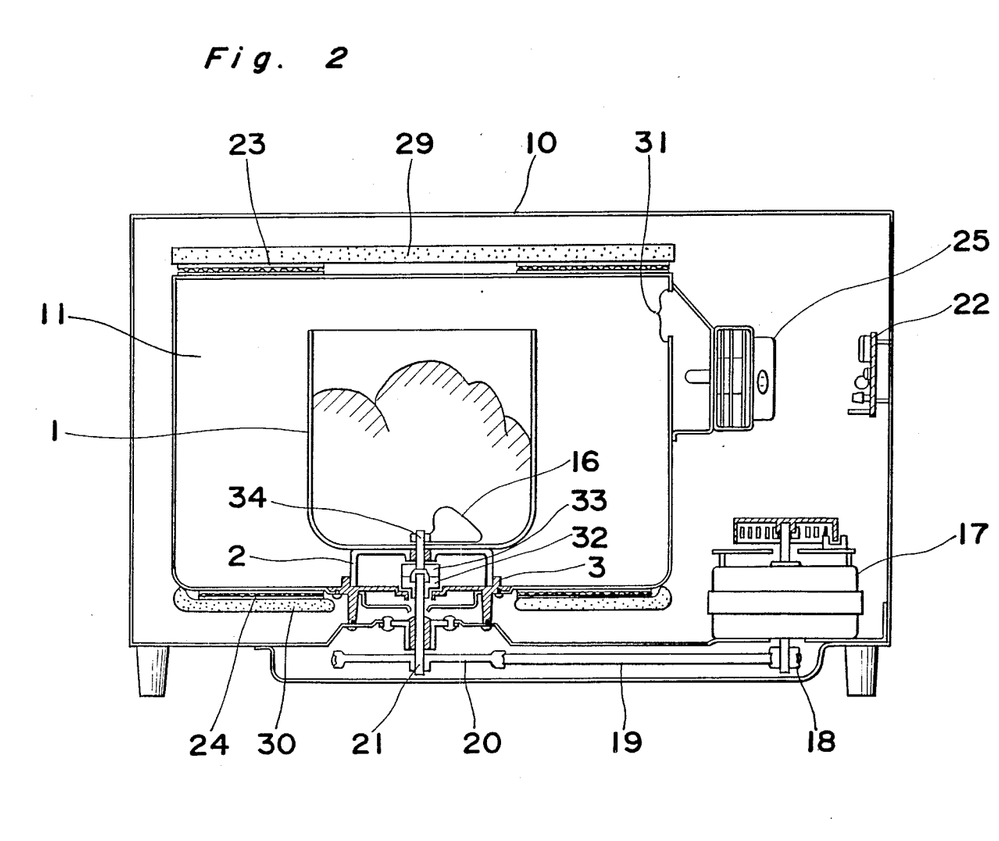
FIG. 2 is a cross sectional view of an essential part of a heating and cooking apparatus according to one preferred embodiment of the present invention.
Figure 3:
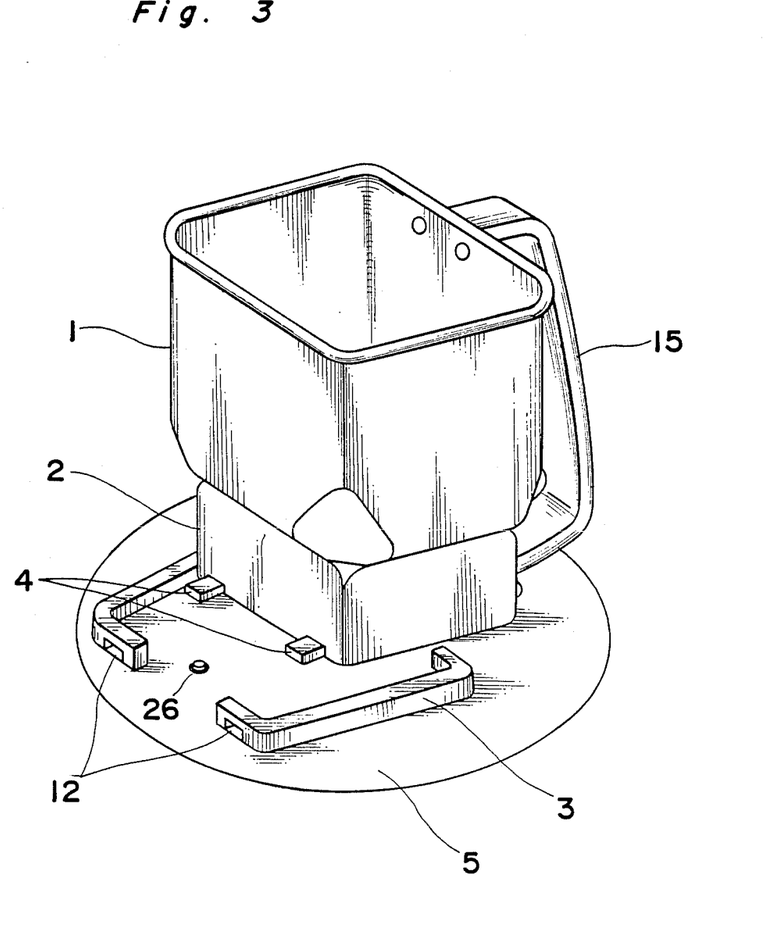
FIG. 3 is an exploded perspective view of an engaging portion of a kneading trough in the heating and cooking apparatus of FIG. 2.
Figure 4:
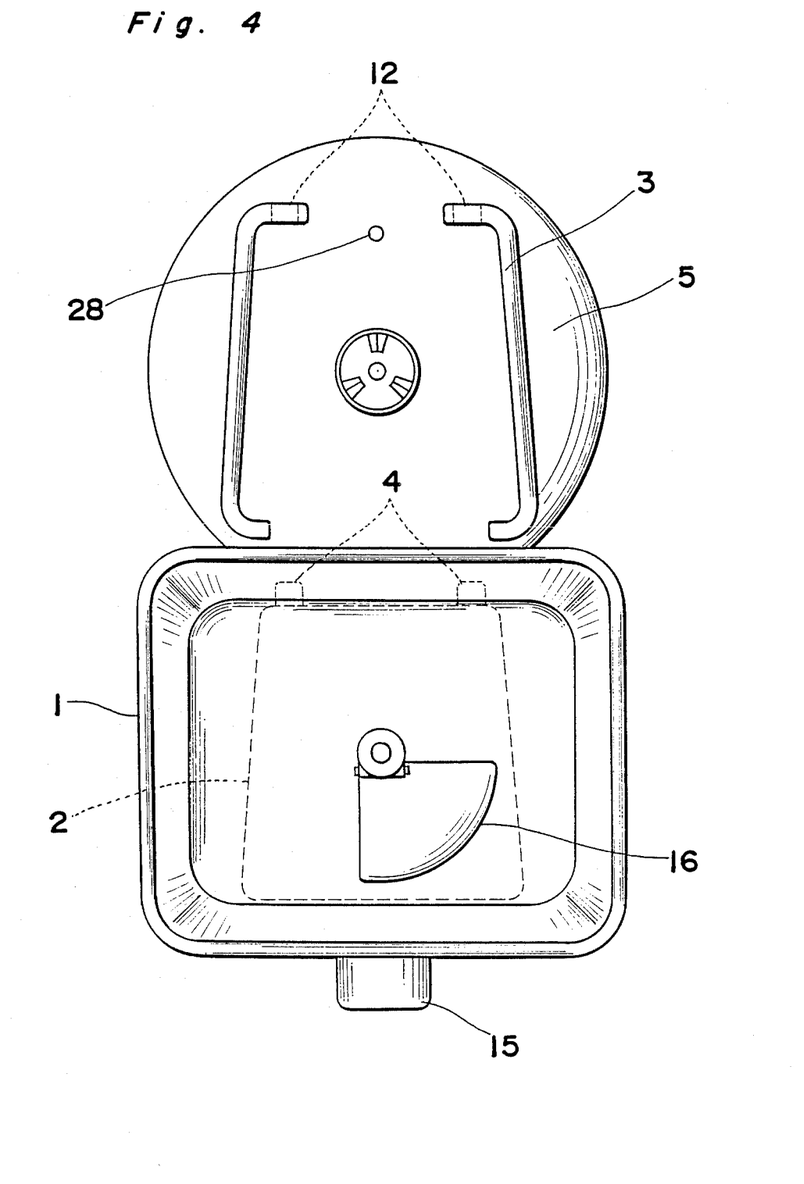
FIG. 4 is an exploded top plan view of the engaging portion of the kneading trough in the heating and cooking apparatus of FIG. 2.
Figure 5:
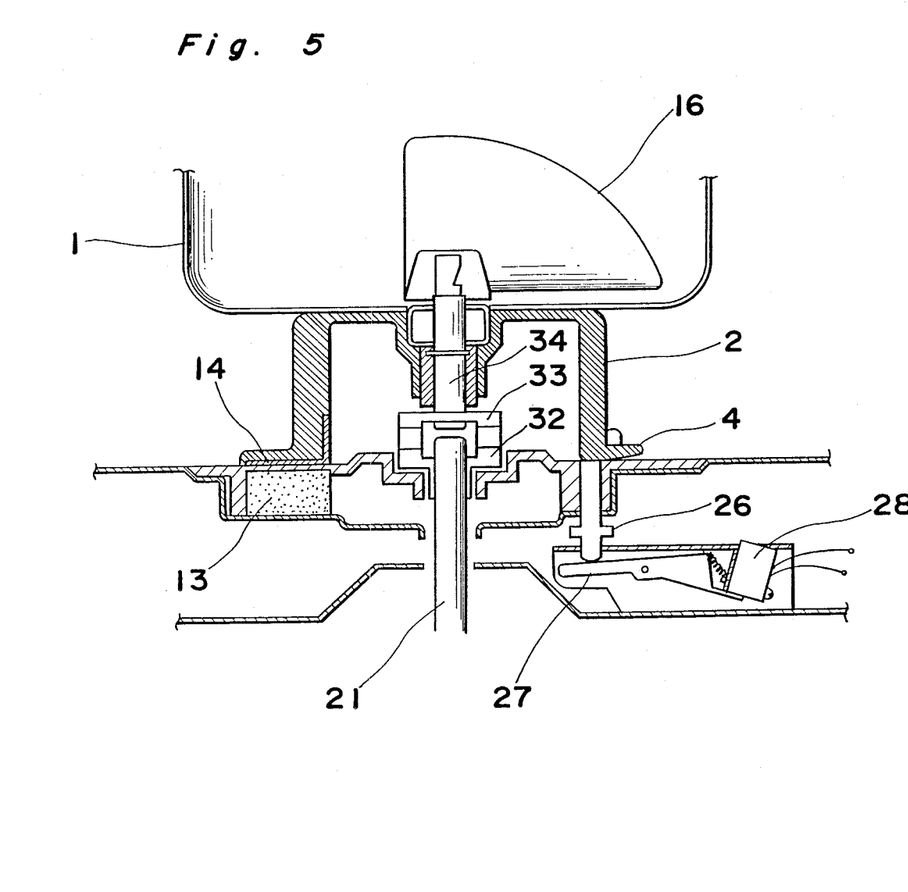
FIG. 5 is a cross sectional view of the engaging portion of the kneading trough in the heating and cooking apparatus of FIG. 2.
Figures 6A, 6C, 7C:
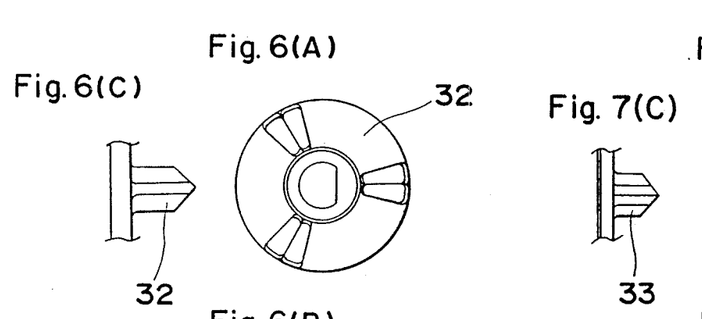
Figure 6B:
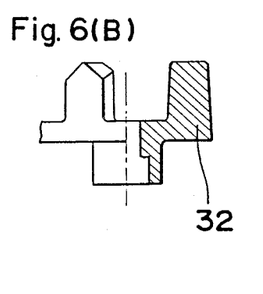
Figure 7A:
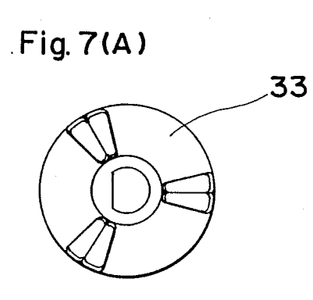
Figure 7B:
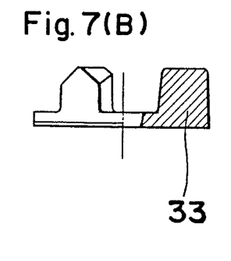

As is described hereinabove, since the kneading trough 1 and the to-be-engaged portion 3 in the heating chamber 11 are formed generally square in the heating and cooking apparatus of the present invention, the conventional locking mechanism 6 is not required, with no necessity for securing the kneading trough in pressed contact with the to-be-engaged portion. On the contrary, the kneading trough can be installed in or taken out of the heating chamber 11 with great ease. Moreover, the force in the rotating direction is received by the corners, and accordingly the kneading trough 1 is prevented from rattling due to the wearing-out or slipping off the to-be-engaged portion 3.

Figure 8:
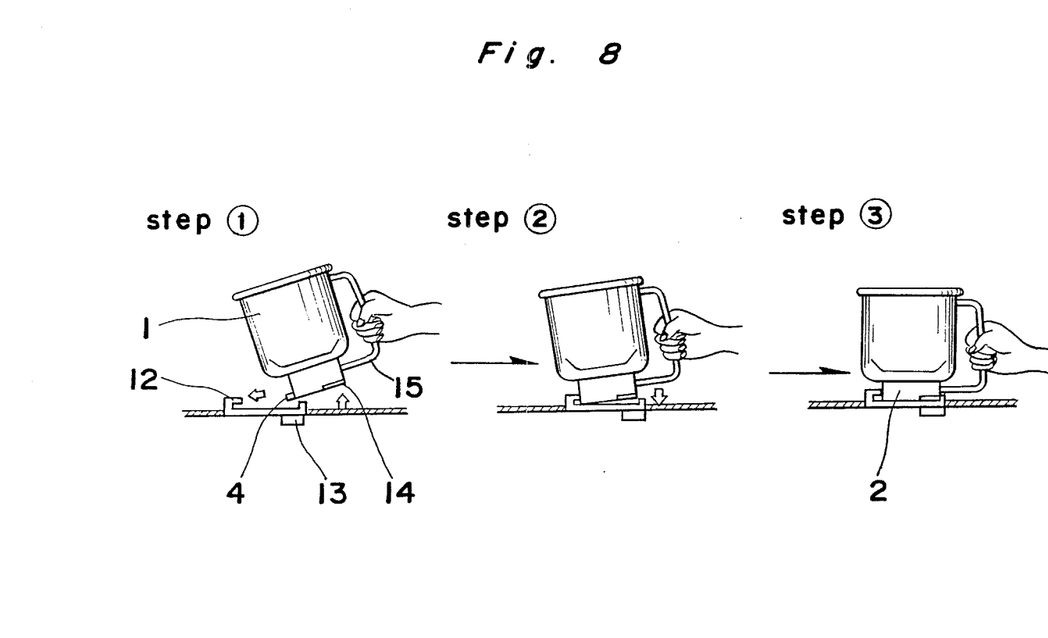
FIG. 8 is a schematic view showing the installation method of the kneading trough in the heating, and cooking apparatus of FIG. 2.

In order to install the kneading trough 1 into the heating chamber 11, first, the projected portion 4 of the foot part 2 of the kneading rough 1 which is formed corresponding to the hole portion 12 is inserted into the whole portion 12 of the to-be-engaged portion 3 in the depth inside the heating chamber, with the help cf the handle 15 mounted in the lateral side of the kneading trough 1. At this time, the to-be-engaged portion 3 serves also as a guide frame, so that the projected portion 4 of the kneading trough 1 can be easily inserted into the hole portion 12 as the kneading trough 1 is being slid. Thereafter, upon placing down the kneading trough 1 onto the fitting part 5 in the heating chamber 11, the permanent magnet 13 provided to the metal plate 14 made of a ferromagnetic material and provided at the bottom of the foot part 2 confronting to the permanent magnet 13, because of the magnetic force.

When the kneading trough 1 is desired to be taken out of the heating chamber, the operation in a reversed order of the foregoing procedure should be carried out.

If the width of the to-be-engaged portion 3 at the side of the opening window of the heating chamber is made larger than that at the deep side of the heating chamber, and the foot part 2 of the kneading trough 1 is formed in the corresponding shape, there may be found sufficient room between the to-be-engaged portion 3 and the kneading trough 1 at the initial stage of the installation of the kneading trough 1. Accordingly, even if the kneading trough 1 is installed without severe attention given to the position of the to-be-engaged portion 3, the to-be-engaged portion 3 serves as the guide frame, so that the room between the to-be-engaged portion 3 and the kneading though 1 is gradually reduced as the kneading trough 1 is inserted along the guide frame while the kneading trough is being slid. Thus, when the kneading trough 1 is completely installed, it can be fixedly secured to the to-be-engaged portion 3. Therefore, fore, the user is never required to give full attention to the position of several projections when he or she fixes the kneading trough as in the conventional case. The installation and detachment of the kneading trough is made much simpler according to the present invention.

The kneading trough can be installed even in the case of a box-shaped heating chamber by sliding the kneading trough from the front of the chamber. Accordingly, the installation arrangement of the present invention is convenient in use and free from such dangers as hurts or burns to the user.

It is to be noted here that the to-be-engaged portion 3 may be formed with a groove, not the hole portion, functioning in the same manner.

Since the handle 15 is provided in the lateral wall of the kneading trough 1, it is greatly convenient that the user can hold the kneading .trough with one hand. Moreover, since the handle is secured to the kneading trough at at least the opposite ends thereof, the kneading trough is consequently reinforced and becomes solid, resulting in improved durability.

In the foregoing embodiment, the to-be-engaged portion 3 is made of aluminum through die casting, and therefore the to-be-engaged portion 3 is ready to be formed into various other configurations. Also, the outer peripheral surface of the to-be-engaged portion 3 can be rendered smooth R. Accordingly, such fears as cutting of a finger, etc. will be avoided. The to-be-engaged portion 3 made through aluminum die casting is sufficiently strong, and the size of the engaging portion of the to-be-engaged portion 3 can be made as small as possible, assuring easiness for cleaning.

In the case where the to-be-engaged portion 3 is made o a sheet metal, the end surface of the to-be-engaged portion 3 may be subjected to R treatment or the like, and the foot part 2 of the kneading trough 1 may be formed into a polygonal shape such as a hexagonal shape, etc. to be strong.

Further, both the fitting part 5 and the to-be-engaged portion 3 may be formed by a sheet metal reducing work through stamping.

The description hereinbelow is directed to a detection unit which is provided so as to detect the presence of the kneading trough thereby to prevent the imperfect engagement of the kneading trough.

When the projected portion 4 formed in the foot part 2 of the kneading trough 1 is positively inserted into the hole portion 12 of the to-be-engaged portion 3, a detection pin 26, is pressed down. The depressed detection pin 26 adds to a detection lever 27 provided below the detection pin 26 the force in the rotating direction, thereby to turn ON a detection switch 28 provided in the lever 27 confronting the detection pin 26. The presence or absence of the kneading trough 1 is detected by a signal from the detection switch 28. In the arrangement as above, the driving motor 17 can be prevented from rotating at high speeds when the kneading trough 1 is not present in the heating chamber. On the other hand, when the kneading trough 1 is installed in the heating chamber, an abnormal heater heating or high-frequency heating operation can be prevented. Moreover, it can be also prevented that the heating and cooking apparatus starts operating when the kneading trough is not positively secure-d with the to-be-engaged engaged portion 3 in the heating chamber, or the engagement of the kneading trough is erroneously released during the rotation because of the insufficient engagement.

Since the detection pin 26 is provided in the fitting part 5 in the direction towards the depth at the bottom of the heating chamber 11 according to the present embodiment, the engagement of the kneading trough 1 with the to-be-engaged portion 3 becomes remarkably strong in the vertical direction when the projected portion 4 in the foot part 2 of the kneading trough 1 is inserted into the hole portion 12 of the to-be-engaged portion 3. Consequently, the detection pin 26 can positively function at the side of the projected portion 4. Since the detection pin 26 is provided in the direction towards the depth of the heating chamber 11 as described above, the heating and cooking apparatus does not start operating unless the kneading trough 1 is perfectly installed in the heating chamber, realizing a highly safe apparatus.

Figure 9:
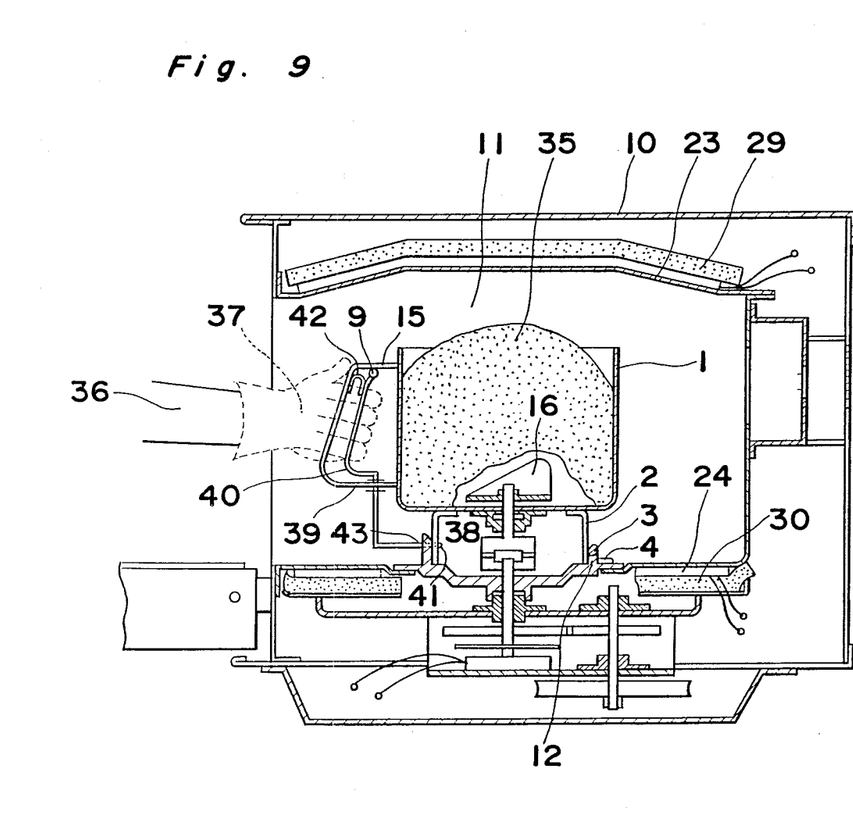
FIG. 9 is across sectional view of an essential part of a heating and cooking apparatus according to a second embodiment of the present invention.
Figure 10:
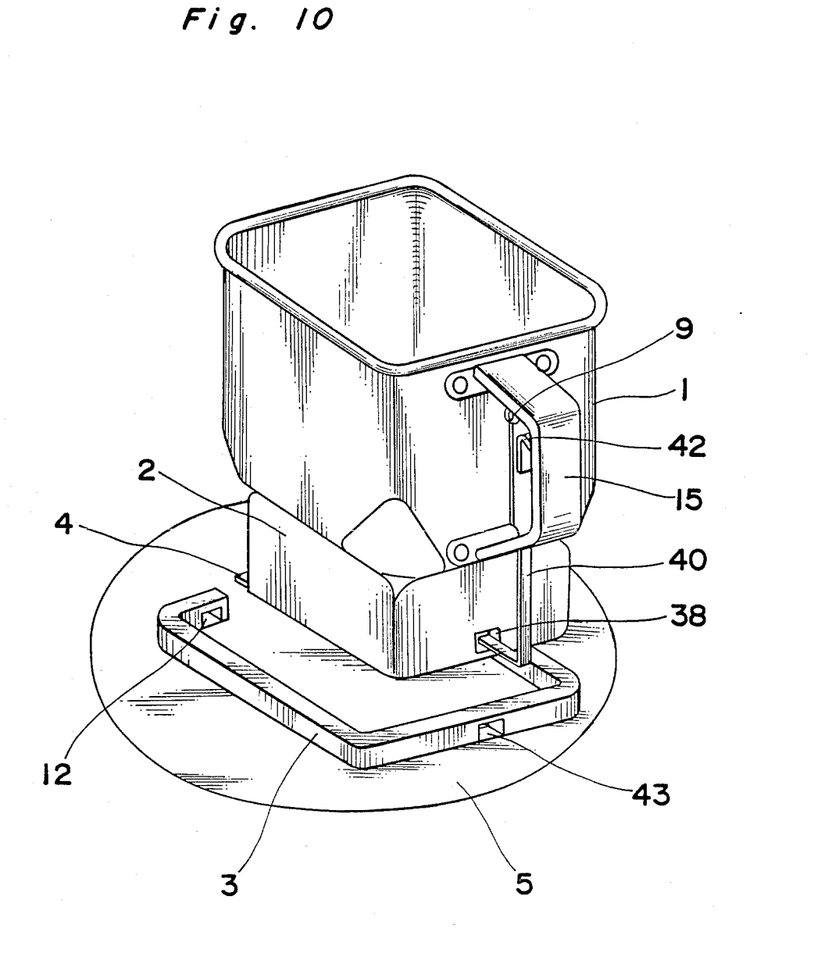
FIG. 10 a perspective view of an engaging portion of a kneading trough in the heating and cooking apparatus of FIG. 9.

FIG. 9 is a cross section of an engaging portion of a heating and cooking apparatus according to a second embodiment of the present invention in the state where an object 35 in the kneading trough 1 which is finished cooking is being taken out of the heating chamber 11 with the use of a protective glove 37 by a user 36. The foot part 2 of the kneading trough 1 is now fixedly secured to the to-be-engaged portion 3 in the heating chamber 11 through engagement therebetween. A lower end 41 of an operating lever 40 which forms a part of the handle 15 fixedly provided with the kneading trough 1 is entered into a second hole portion 43 formed in the to-be-engaged portion 3 and also into a through-hole 38 formed in the foot part 2 of the kneading trough 1 correspondingly to the second hole portion 43. The upper part of the operating lever 40 is supported rotatably at a fulcrum 9 in the handle 15. Moreover, the operating lever 40 is urged by a leaf spring 42 in a counterclockwise direction at the center of the fulcrum 9. The operation lever 40 which passes through a guide groove 39 formed in the handle 15 slides in the handle 15 along the guide groove 39. In the to-be-engaged portion 3, the projected portion 4 provided opposite to the handle 15 in the foot part 2 of the kneading trough 1 is fixedly inserted in the hole portion 12 in the depth of the heating chamber 11. When the user 36 takes the handle 15 and holds the operating lever 40 of the kneading trough, the end portion 41 of the operating lever 40 comes out from the through-hole 38 and the second hole portion 43 of the to-be-engaged portion 3. In the above-described state, when the user 36 takes the handle 15 upwards and pulls frontwards, the engagement of the hole portion 12 in the to-be-engaged portion 3 with the projected portion 4 in the foot part 2 of the kneading trough 1 is released, so that the user 36 can easily get the kneading trough 1 outside the heating chamber of the apparatus with much safety. If the kneading trough 1 is desired to be installed in the heating chamber 11, it is enough that the above-described sequence of operations be carried out in the reverse order. In this case, the to-be-engaged portion 3 functions as, a guide frame, and therefore if, only the kneading trough 1 is installed, while being slid, into the heating chamber without confirming the position of the to-be-engaged portion 3, the hole portion 12 of the to-be-engaged portion 3 can be easily engaged with the projected portion 4 of the foot part 2 of the kneading trough 1. The kneading trough 1 should then be placed down onto the to-be-engaged portion 3, with the user's hand off, and the end portion 41 of the operating lever 40 passes through the second hole portion, 43 of the to-be-engaged portion 3 to be fixedly inserted into the through-hole 38 of the kneading trough 1.

Accordingly, as has been described hereinabove, the following advantages can be achieved by the present invention.

(1) The kneading trough and the to-be-engaged portion in the heating chamber are respectively formed into a polygonal shape, and therefore the engagement between the kneading trough and the to-be-engaged portion in the heating chamber can be easily accomplished with increased strength in the rotating direction, without any possibilities of rattlings or disengagement resulting from the friction therebetween. No complicated mechanism such as the lock mechanism or the like can be dispensed with for the reverse rotation of the kneading vane.

(2) The one side of the kneading trough is fixedly secured through the engagement or insertion of the projected portion into the hole portion of the to-be-engaged portion in the heating chamber, while the other side of the kneading trough is arranged to be fixed to the heating chamber by magnetic force. Accordingly, the kneading trough is able to be easily installed or taken from the heating chamber even in a box-shaped heating and cocking apparatus, so that a dangerous injury or burn may be avoided when it is too hot in the heating chamber immediately after cooking. If a handle is provided in the lateral wall of the kneading trough, the kneading trough can be held by one hand of the user, enhancing the using efficiency.

(3) If the to-be-engaged portion in the heating chamber is formed by molded components made, for example, by aluminum die casting, the strength of the to-be-engaged portion is increased, and the bottom of the heating chamber can be less rough with little projections, thereby to increase the convenience in cleaning and maintenance from the hygienic viewpoint. The molded component can be smooth R, reducing the danger of a finger cutting or the like in cleaning.

detection unit provided at the side of the (4) The detection unit provided at the side of the projected portion of the kneading trough ensures correct and positive operation of the detection switch. Therefore, the high-speed rotation when the kneading trough is not present in the heating chamber and/or the abnormal use when the kneading trough is present can be prevented, thus advantageously improving the safety of the apparatus.

(5) The kneading trough which can be put into the heating chamber directly with the raw materials for breads, cakes, etc. kneaded therein has the handle, so that the user can hold the kneading trough by one hand. Accordingly, the kneading trough is easy to be installed in or taken out of the heating chamber. Particularly, for example, when the heating chamber is high in temperatures immediately after cooking, it might be awfully dangerous that the user holds the kneading trough by both hands so as to release the engagement of the kneading trough with the main body of the apparatus through necessary manipulations such as twisting or the like. Therefore, the heating and cooking apparatus of the present invention can be said to be highly safe and convenient for use.

(6) The kneading trough having the handle provided in the lateral wall thereof is convenient for use when it is cleaned after use. Moreover, the handle of the kneading trough is made of so rigid material and secured to the kneading trough at at least opposite ends thereof that the kneading trough becomes accordingly solid and durable, realizing a long-life of the apparatus.

Although the present invention has been fully described by way of example with reference to the accompanying drawings, it is to be noted here that various changes and modifications will be apparent to those skilled in the art. Therefore, unless such changes and modifications otherwise depart from the scope of the invention, they should be construed as included therein.

What is claimed is:

1. A heating and cooking apparatus which comprises:
   a heating chamber having a side opening for heating an object to be cooked therein;
   a heating means for heating said heating chamber;
   a kneading trough detachably installed through said side opening in said heating chamber;
   a kneading vane for kneading the object to be cooked in said kneading trough;
   a motor for rotating said kneading vane;
   a transmission means for transmitting the rotating force of said motor;
   a first engagement arrangement having strong engaging force by insertion motion substantially perpendicular to the plane of said side opening and provided at the inner side of said heating chamber; and
   a second engagement arrangement which is easy to be engaged and disengaged and, provided at the opening side of said heating chamber.

2. A heating and cooking apparatus as claimed in claim 1, wherein said first engagement arrangement is such that a projected portion is formed in a foot part of the kneading trough in the depth side of the heating chamber, and a hole portion or a grooved portion is formed in a to-be-engaged portion at the bottom of the heating chamber in a manner to confront said projected portion, so that when said projected portion is inserted into said hole portion or grooved portion, the kneading trough is fixed to the to-be-engaged portion at one end thereof, while said second engagement arrangement is so constructed that a magnetic element is provided in the foot part of said kneading trough at the opening side of the heating chamber, and a second engaging means made of magnetic material is provided in the to-be-engaged portion at the bottom of the heating chamber in a manner to confront said magnetic element at the opening side of the heating chamber, so that said kneading trough is fixedly secured to the to-be-engaged portion through mutual magnetic force of the magnetic element and the second engaging means.

3. A heating and cooking apparatus as claimed in claim 2, wherein said second engagement arrangement is so constructed that the magnetic element in the foot part of the kneading trough in made of a ferromagnetic magnet, and the second engaging means provided in the to-be-engaged portion correspondingly to said magnetic element is made of a permanent material.

4. A heating and cooking apparatus as claimed in claim 1, wherein said first engagement arrangement is so constructed that the movable projected portion is formed in the foot part of the kneading trough and, the hole portion or the grooved portion is formed in the to-be-engaged portion correspondingly to the movable projected portion, characterized in that the engagement of the kneading trough with the to-be-engaged portion is maintained or released by the movement of said movable projected portion.

5. A heating and cooking apparatus as claimed in claim 4, wherein said kneading trough is provided with a handle at the opening side of the heating chamber when the kneading trough is laterally installed in the heating chamber, said handle being provided with an operating part so as to maintain or release the engagement between the kneading trough and the to-be-engaged portion.

6. A heating and cooking apparatus as claimed in claim 1, wherein a handle is mounted in the kneading trough at the opening side of the heating chamber when the kneading trough is laterally installed in the heating chamber, so that the kneading trough can be carried and installed in the heating chamber by the use of the handle.

7. A heating and cooking apparatus as claimed in claim 1, wherein a detection unit for detecting the presence of the kneading trough is further provided in the to-be-engaged portion correspondingly to the projected portion of the foot part of the kneading trough.

8. A heating and cooking apparatus which comprises:
   a heating chamber having a side opening for heating an object to be cooked therein;
   a heating means for heating said heating chamber;
   a kneading trough detachably installed through said side opening in said heating chamber;
   a kneading vane for kneading the object to be cooked in said kneading trough;
   a motor for rotating said kneading vane; and
   a transmission means for transmitting the rotating force of said motor,
   wherein a projection is formed in a to-be-engaged portion at the bottom of said heating chamber, and an engaging portion, is provided in a foot part of said kneading
   trough at a position corresponding to said projection so for receiving said projection by insertion motion substantially perpendicular to the plane of said opening as to prevent the rotation of the kneading trough.

9. A heating and cooking apparatus as claimed in claim 8, wherein said foot part of the kneading trough is formed in such shape as to be partially or completely engaged with the to-be-engaged portion at the bottom of the heating chamber, characterized in that said foot part forms an engaging portion by itself to hold the kneading trough.

10. A heating and cooking apparatus as claimed in claim 9, wherein both said foot part of the kneading trough and said to-be-engaged portion in the heating chamber are formed respectively in a polygonal shape having more than four corners to hold the kneading trough.

11. A heating and cooking apparatus as claimed in claim 9, wherein sad projection of the to-be-engaged portion in the heating chamber is rendered in a rail-like from to be partially or totally engaged with the foot part of the kneading trough, while serving as a guide frame when the kneading trough is installed in or removed from the heating chamber.

12. A heating and cooking apparatus as claimed in claim 9, wherein the width of the to-be-engaged portion at the opening side of the heating chamber is made larger than that at the deep side of the heating chamber, so that said to-be-engaged portion is partially or totally engaged with said foot part of the kneading trough, serving as a guide frame when the kneading trough is installed in or taken out of the heating chamber.

13. A heating and cooking apparatus as claimed in claim 9, wherein the width of the to-be-engaged portion in the front-and-back direction of the heating chamber is made greatly different from the of the foot part of the kneading trough in the same direction, so that the foot part of the kneading trough is partially engaged with the to-be-engaged portion.

14. An installation method of the kneading trough into the heating chamber of a heating and cooking apparatus, which comprises: a heating chamber having a side opening for heating an object to be cooked, therein a heating means for heating said heating chamber, a kneading trough detachably installed through said side opening in said heating chamber, a kneading vane for kneading the object to be cooked in said kneading trough, a motor for rotating said kneading vane and a transmission means for transmitting the rotating force of said motor, comprising the steps of:
1 inserting by insertion motion substantially perpendicular to the plane of said side opening a projected portion formed in the lower part of the kneading trough into a first to-be-engaged part in the depth at the bottom of the heating chamber so as to be coupled with each other;
2 coupling the kneading trough with a rotary driving unit by moving the kneading trough to the side of the bottom of the heating chamber; and
3 coupling an engaging portion formed in the lower part of the kneading trough correspondingly to a second to-be-engaged part with said second to-be-engaged part provided at the opening side at the bottom of the heating chamber.

* * * * *